(12) United States Patent
Wakabayashi et al.

(10) Patent No.: US 12,206,127 B2
(45) Date of Patent: Jan. 21, 2025

(54) BATTERY PACK INCLUDING FLAME-RETARDANT CAP

(71) Applicant: SANYO Electric Co., Ltd., Osaka (JP)

(72) Inventors: Takeaki Wakabayashi, Hyogo (JP); Kensaku Takeda, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 808 days.

(21) Appl. No.: 17/422,732

(22) PCT Filed: Dec. 9, 2019

(86) PCT No.: PCT/JP2019/048014
§ 371 (c)(1),
(2) Date: Jul. 13, 2021

(87) PCT Pub. No.: WO2020/153015
PCT Pub. Date: Jul. 30, 2020

(65) Prior Publication Data
US 2022/0085453 A1 Mar. 17, 2022

(30) Foreign Application Priority Data
Jan. 25, 2019 (JP) .............................. 2019-011545

(51) Int. Cl.
*H01M 50/383* (2021.01)
*H01M 10/0525* (2010.01)
(Continued)

(52) U.S. Cl.
CPC ..... *H01M 50/383* (2021.01); *H01M 10/0525* (2013.01); *H01M 50/155* (2021.01);
(Continued)

(58) Field of Classification Search
None
See application file for complete search history.

(56) References Cited

U.S. PATENT DOCUMENTS

2013/0071706 A1* 3/2013 Lee ..................... H01M 10/486
429/62
2021/0091428 A1* 3/2021 Naito .................. H01M 50/209

FOREIGN PATENT DOCUMENTS

CA 2938316 A1 8/2015
JP 2010-055957 3/2010
(Continued)

OTHER PUBLICATIONS

International Search Report of PCT application No. PCT/JP2019/048014 dated Mar. 3, 2020.
(Continued)

*Primary Examiner* — Zhongqing Wei
(74) *Attorney, Agent, or Firm* — WHDA, LLP

(57) ABSTRACT

In the battery pack, battery cell including a discharge valve is housed in case, and flame-retardant cap is disposed at a position facing discharge valve side end surface of battery cell. Flame-retardant cap includes collision plate disposed at a position facing discharge valve side end surface and wall formed around collision plate, the discharge valve of the battery cell and a region in proximity are arranged inside peripheral wall, and reverse ejection gap is provided between battery cell and peripheral wall. An expansion space of the discharge gas flowing in from reverse ejection gap is provided inside case. In the expansion space, the discharge gas ejected from the discharge valve collides with collision plate of flame-retardant cap, and fills the expansion space via diffusion gap and reverse ejection gap.

12 Claims, 10 Drawing Sheets

(51) Int. Cl.
  *H01M 50/155* (2021.01)
  *H01M 50/213* (2021.01)
  *H01M 50/24* (2021.01)
  *H01M 50/247* (2021.01)

(52) U.S. Cl.
  CPC ......... *H01M 50/213* (2021.01); *H01M 50/24* (2021.01); *H01M 50/247* (2021.01)

(56) References Cited

FOREIGN PATENT DOCUMENTS

JP   2016-035817 A   3/2016
WO   WO-2019187313 A1 * 10/2019   .......... H01M 10/613

OTHER PUBLICATIONS

The Extended European Search Report dated Feb. 23, 2022, issued in counterpart EP Application No. 19911091.7. (8 pages).

* cited by examiner

BATTERY PACK INCLUDING FLAME-RETARDANT CAP

CROSS-REFERENCE TO RELATED APPLICATIONS

This application is a U.S. national stage application of the PCT International Application No. PCT/JP2019/048014 filed on Dec. 9, 2019, which claims the benefit of foreign priority of Japanese patent application No. 2019-011545 filed on Jan. 25, 2019, the contents all of which are incorporated herein by reference.

TECHNICAL FIELD

The present invention relates to a battery pack that houses a battery that can be charged in an exterior case.

BACKGROUND ART

In recent years, a battery pack used as a power supply of a portable electric device has been further required to have a high output, and a non-aqueous electrolyte secondary battery such as a lithium-ion battery having excellent efficiency per unit volume has been adopted. Although the lithium-ion battery has a high output, an internal pressure may increase for some reason. In order to ensure safety against an increase in the internal pressure of the battery, a discharge valve opened at a set pressure to prevent rupture is provided. When the discharge valve is opened, the battery is in an abnormal heat generation state, and a high-temperature gas is vigorously ejected from the discharge valve. The high-temperature gas ejected from the discharge valve has high thermal energy and kinetic energy, and thermally melts and damages an exterior case. The damaged exterior case ejects high-temperature ejection gas to the outside of the case, but the gas ejected to the outside may come into contact with air and may ignite. In order to prevent the exterior case from being damaged by the discharge gas from the discharge valve, a battery pack in which a heat-resistant spacer is disposed at a position facing a discharge valve side end surface of the battery has been developed. (see PTL 1)

CITATION LIST

Patent Literature

PTL 1: Unexamined Japanese Patent Publication No. 2010-55957

SUMMARY OF THE INVENTION

In the battery pack of PTL 1, a heat-resistant plate member such as a mica plate is disposed between the discharge valve side end surface of the battery and an inner surface of the exterior case. This battery pack can prevent the discharge gas ejected from the discharge valve from colliding with the mica plate and from being directly ejected to the exterior case. However, since the discharge gas ejected from the discharge valve of the lithium-ion battery which is the non-aqueous electrolyte secondary battery is vigorously ejected at an abnormally high temperature greater than or equal to 400° C., even after the discharge gas collides with the mica plate and is redirected to a front direction, the discharge gas vigorously collides with the inner surface of the exterior case while the abnormally high temperature is maintained. The discharge gas ejected to the inner surface of the exterior case in this state thermally melts and damages the exterior case, and the discharge gas is jetted to the outside of the case from the damaged portion. The battery pack in which the high-temperature discharge gas ejected from the discharge valve is ejected to the outside of the case does not ensure high safety due to smoking, ignition, and the like. Since a flame caused in the exterior case is released to the outside of the case from the hole of the exterior case, safety cannot be further ensured.

The present invention has been made based on such findings of the present inventors. A main object of the present invention is to provide a battery pack capable of improving safety by suppressing adverse effects caused by a high-temperature discharge gas ejected from a discharge valve of a battery and suppressing releasing of a flame to the outside of a case.

A battery pack of the present invention includes battery cell 1 having a discharge valve opened when an internal pressure exceeds a set pressure, and case 2 housing battery cell 1. Flame-retardant cap 6 is disposed at a position facing discharge valve side end surface 1a of battery cell 1 with diffusion gap 28 provided between discharge valve side end surface 1a and the flame-retardant cap. Flame-retardant cap 6 includes collision plate 6A disposed at a position facing discharge valve side end surface 1a and peripheral wall 6B formed around collision plate 6A, and a discharge valve of battery cell 1 and a region in proximity are arranged inside peripheral wall 6B, and reverse ejection gap 30 is provided between battery cell 1 and peripheral wall 6B. Expansion space 25 of a discharge gas flowing in from reverse ejection gap 30 is provided inside case 2. In expansion space 25, the discharge gas ejected from the discharge valve collides with collision plate 6A of flame-retardant cap 6, and fills expansion space 25 via diffusion gap 28 and reverse ejection gap 30.

The battery pack described above is characterized in that it is possible to prevent the high-temperature discharge gas ejected from the opened discharge valve from being vigorously jetted to the outside of the case, to prevent adverse effects such as ignition, and to improve safety. This is because the battery pack described above causes the high-temperature discharge gas having high energy ejected from the discharge valve to collide with the collision plate of the flame-retardant cap and diffuse in the diffusion gap, the diffused discharge gas further flows into the reverse ejection gap, the flow is redirected to the direction opposite to the ejection direction of the discharge valve, the energy is attenuated, and the discharge gas flowing in from the reverse ejection gap into the expansion space and filled in the expansion space is further attenuated in energy in the expansion space.

DESCRIPTION OF EMBODIMENTS

Figure 1:
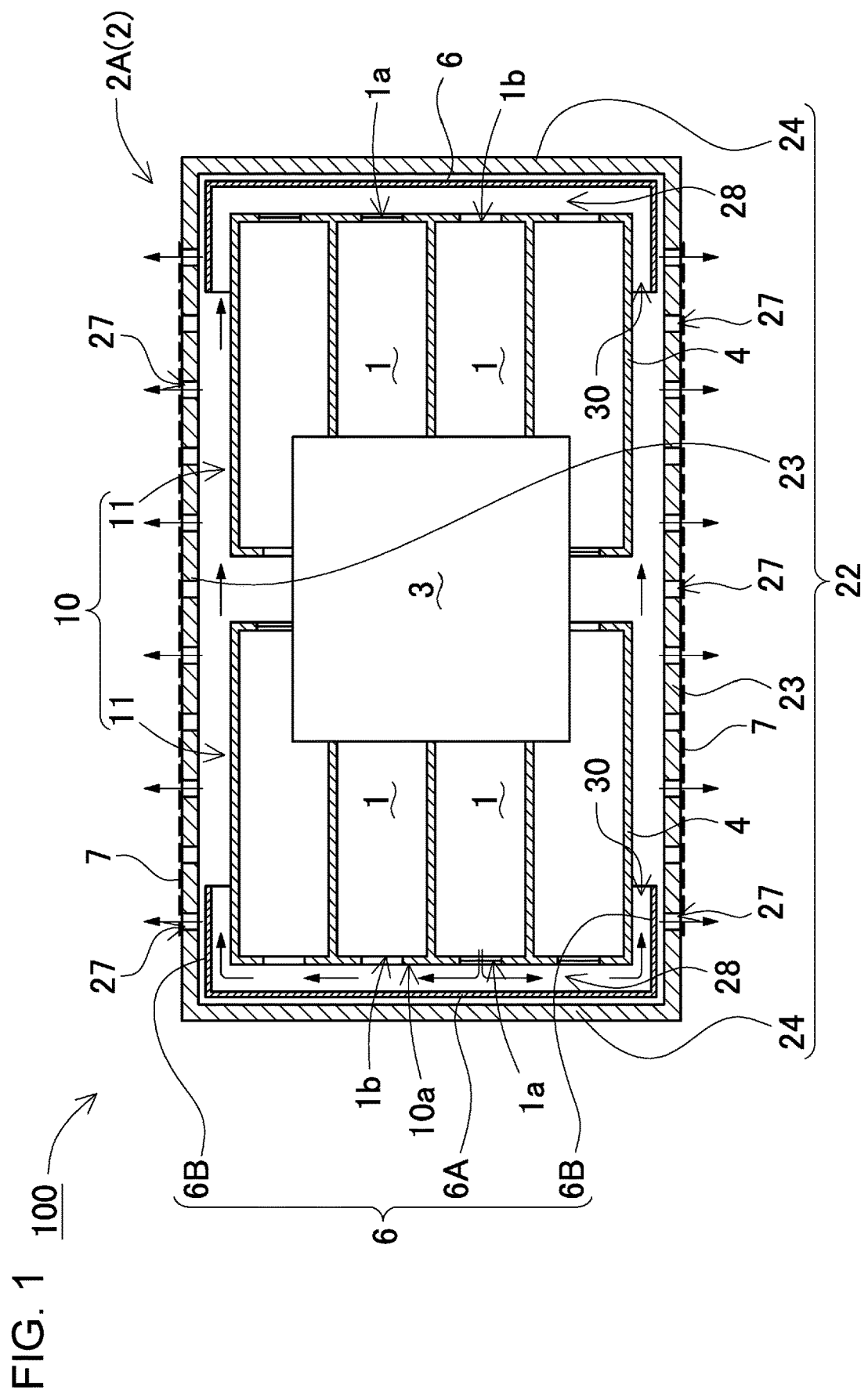
FIG. 1 is a schematic horizontal cross-sectional view illustrating an internal structure of a battery pack according to a first exemplary embodiment of the present invention.
Figure 2:
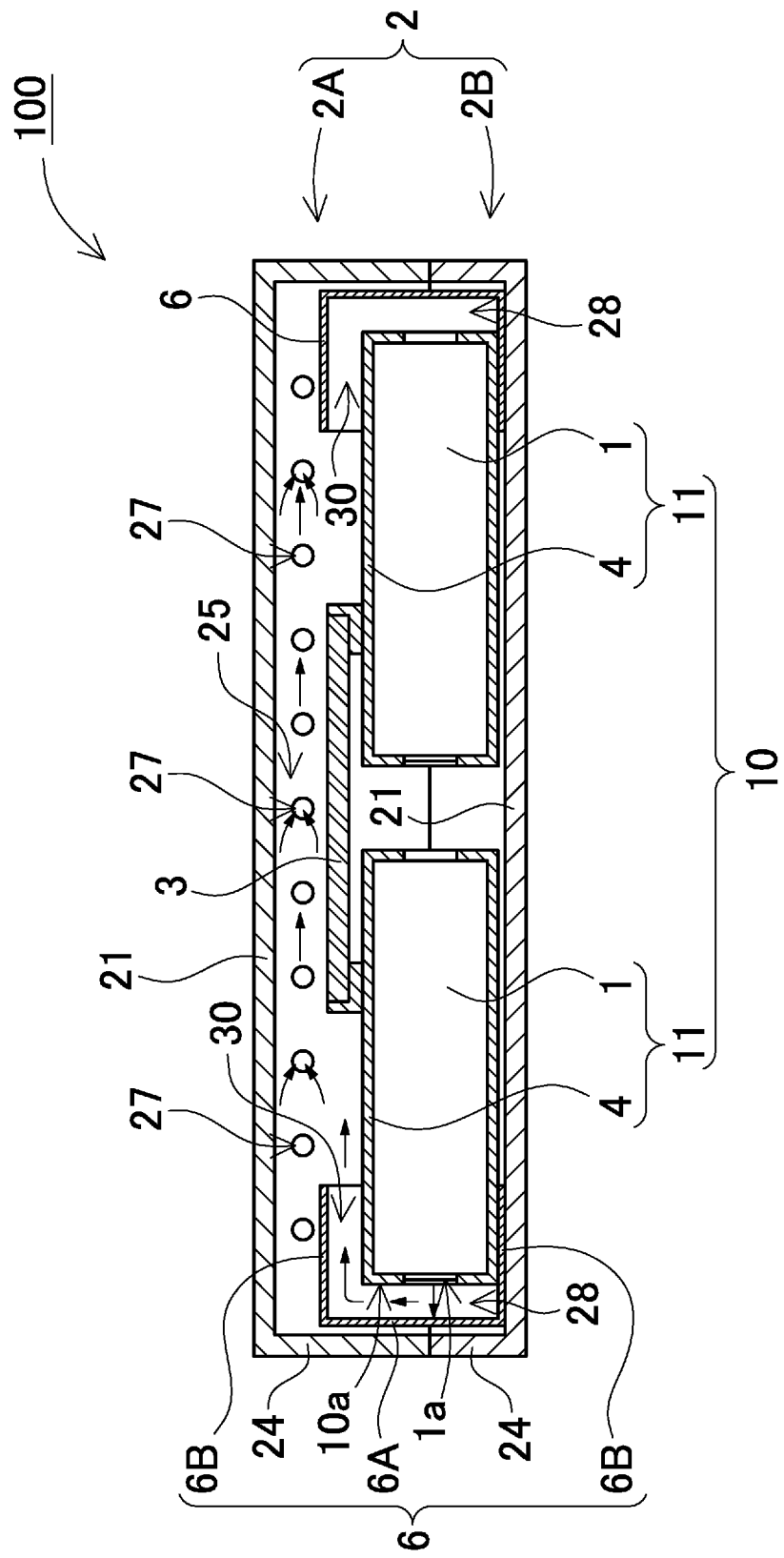
FIG. 2 is a vertical longitudinal cross-sectional view of the battery pack according to the first exemplary embodiment of the present invention.
Figure 3:
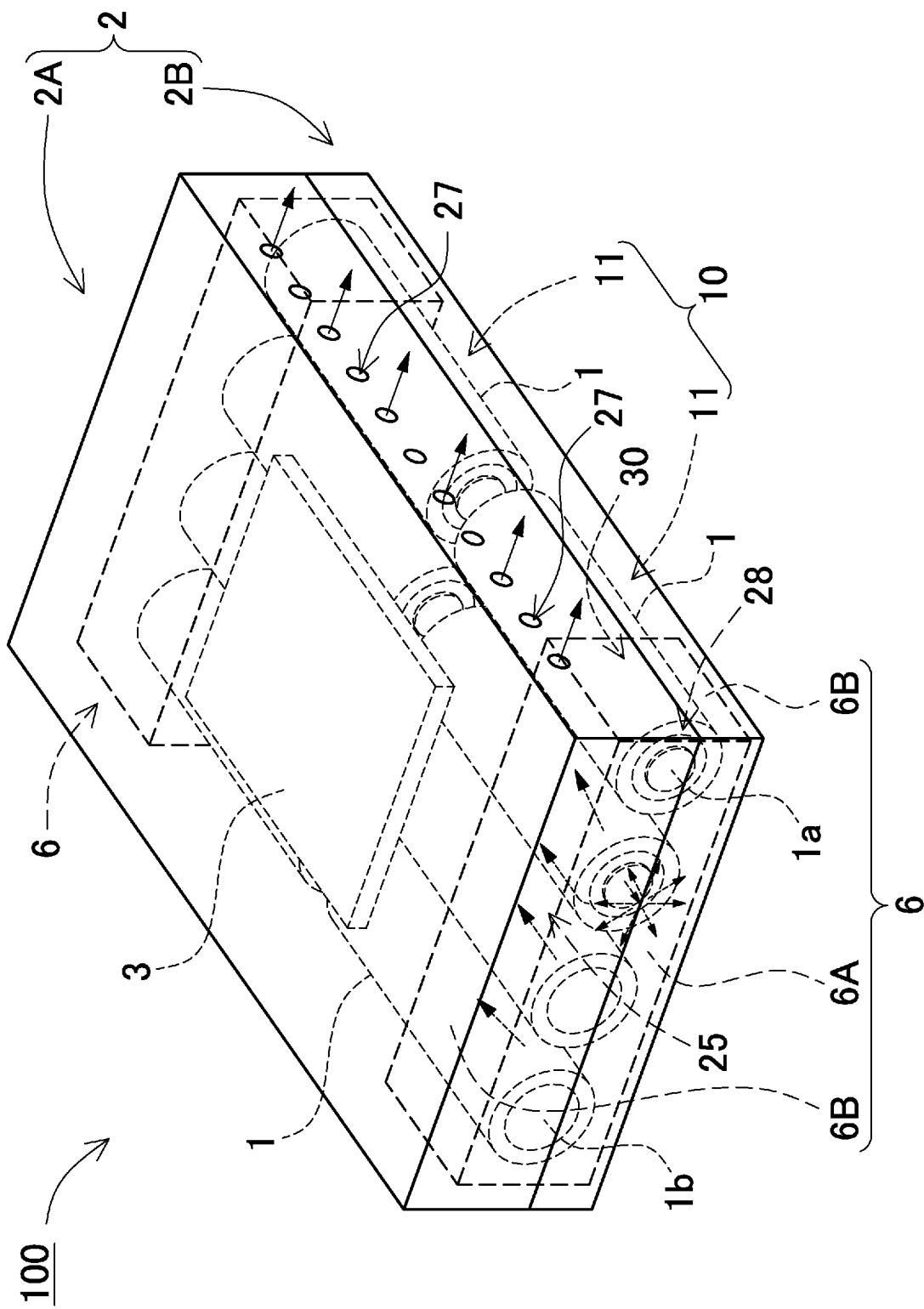
FIG. 3 is a schematic perspective view illustrating the internal structure of the battery pack according to the first exemplary embodiment of the present invention.
Figure 4:
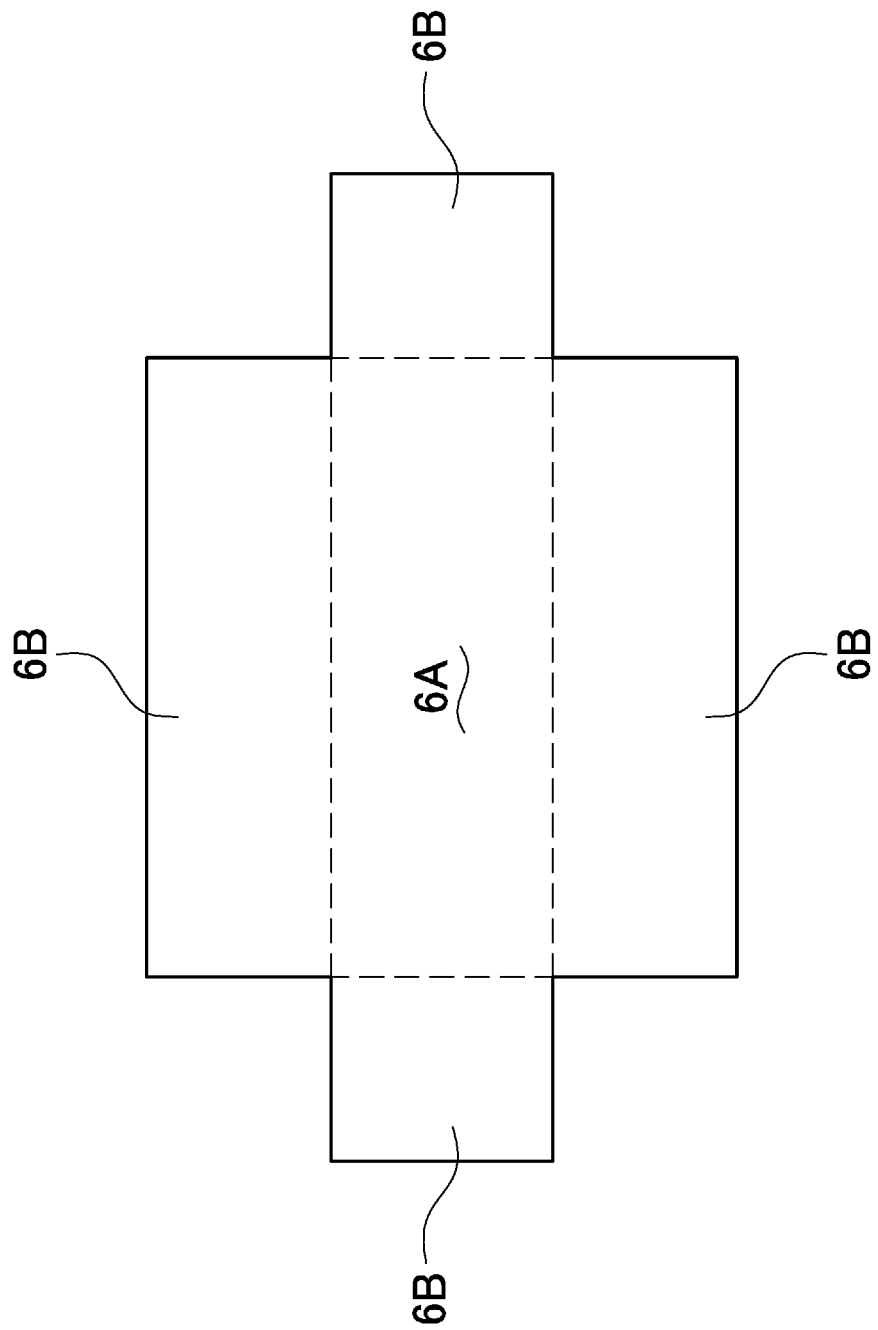
FIG. 4 is a development view of a flame-retardant cap illustrated in FIG. 3.

A first invention of the present invention is a battery pack including a battery cell having a discharge valve opened when an internal pressure exceeds a set pressure, and a case housing the battery cell. A flame-retardant cap is disposed at a position facing a discharge valve side end surface of the battery cell with a diffusion gap provided between the discharge valve side end surface and the flame-retardant cap, the flame-retardant cap includes a collision plate disposed at a position facing the discharge valve side end surface and a peripheral wall formed around the collision plate, a discharge valve of the battery cell and a region in proximity are arranged inside the peripheral wall, and a reverse ejection gap is provided between the battery cell and the peripheral wall, an expansion space of a discharge gas flowing in from the reverse ejection gap is provided inside the case, and in the expansion space, the discharge gas ejected from the discharge valve collides with the collision plate of the flame-retardant cap, and fills the expansion space via the diffusion gap and the reverse ejection gap.

In a second invention of the present invention, the case includes a plurality of flue gas holes that discharges the discharge gas ejected from the discharge valve of the battery cell to an outside of the case, the flue gas hole is opened to a case surface in a direction in which a discharge direction of the discharge gas discharged from the flue gas hole and an ejection direction of the discharge gas discharged from the discharge valve of the battery valve, the expansion space is communicatively connected with the reverse ejection gap and an inner opening of the flue gas hole of an inner surface of the case, and the discharge gas ejected from the discharge valve is dispersed into the plurality of flue gas holes and is discharged to the outside of the case.

In a third invention of the present invention, the flame-retardant cap is a flexible heat-resistant sheet. The battery pack described above is characterized in that the battery cell can be easily and smoothly disposed inside the flame-retardant cap. This is because the flame-retardant cap is deformed and the battery cell can be inserted into the peripheral wall.

In a fourth invention of the present invention, the flame-retardant cap is a heat-resistant fiber sheet formed by forming heat-resistant fibers into a sheet shape.

In a fifth invention of the present invention, the flame-retardant cap is a nonwoven fabric formed by assembling heat-resistant fibers without directionality, or a fiber sheet formed by braiding heat-resistant fibers.

In a sixth invention of the present invention, the heat-resistant fibers are either inorganic fibers or heat-resistant plastic fibers.

In a seventh invention of the present invention, the flame-retardant cap is either a heat-resistant plastic sheet or a plastic plate.

In an eighth invention of the present invention, the battery cell is a non-aqueous electrolyte secondary battery. In a ninth invention of the present invention, the battery cell is a lithium-ion battery.

In a tenth invention of the present invention, the battery cell is a battery having a cylindrical shape, and a battery block is provided by arranging end surfaces of a plurality of the cylindrical batteries in an identical plane and arranging the plurality of batteries in parallel with each other, and an end of the battery block is inserted into the flame-retardant cap.

In an eleventh invention of the present invention, the case has a non-sealed structure. In a twelfth invention of the present invention, at least a part of the case is a porous plate having a plurality of through-holes. The battery pack described above is characterized in that the discharge gas in the case can be smoothly discharged to the outside.

Hereinafter, the present invention will be described in detail with reference to the drawings. In the following description, terms (for example, "upper", "lower", and other terms including these terms) indicating specific directions and positions are used as necessary, but these terms are used to facilitate understanding of the invention with reference to the drawings, and the technical scope of the present invention is not limited by the meanings of these terms. Parts denoted by identical reference marks in a plurality of drawings indicate identical or equivalent parts or members.

The following exemplary embodiments illustrate specific examples of the technical idea of the present invention, and do not limit the present invention to the following exemplary embodiments. Unless otherwise specified, dimensions, materials, shapes, relative arrangements, and the like of constituent components to be described below are not intended to limit the scope of the present invention, but are intended to be illustrative. Contents described in one exemplary embodiment and example are also applicable to other exemplary embodiments and examples. Sizes, positional relationships, and the like of members illustrated in the drawings may be exaggerated in order to clarify the description.

First Exemplary Embodiment

Battery pack 100 illustrated in FIGS. 1 to 4 includes a plurality of battery cells 1, battery holder 4 in which battery cells 1 are arranged at fixed positions, circuit board 3 fixed to battery holder 4, flame-retardant caps 6 arranged at positions facing discharge valve openings of battery cells 1, and case 2 in which battery cells 1 arranged at the fixed positions in battery holders 4, circuit board 3, and flame-retardant caps 6 are arranged.

(Battery Cell 1)

Battery cell 1 is a battery having a cylindrical shape. In the cylindrical battery, an electrode and an electrolytic solution are housed in a metal case having a cylindrical shape. The metal case has a sealed structure in which a sealing plate is airtightly fixed to an opening of an exterior can blocking a bottom. The exterior can is manufactured by pressing a metal plate. The sealing plate is airtightly fixed by being crimped to a peripheral edge of the opening of the exterior can with an insulating packing interposed therebetween.

Although not illustrated, a discharge valve on the sealing plate is provided in battery cell 1 in order to prevent damage due to an abnormally high internal pressure of the metal case. In the discharge valve, an opening through which an internal gas and the like are discharged in an opened state is provided in the sealing plate. However, in the battery cell, the discharge valve and the opening thereof may be provided at a bottom portion of the exterior can. When the internal pressure becomes higher than a set pressure, for example, 1.5 MPa, the discharge valve is opened to prevent destruction of the metal case due to an increase in the internal pressure. The discharge valve is opened in an abnormal state. Accordingly, in a state in which the discharge valve is opened, a temperature of battery cell 1 is also very high. Thus, the gas and the electrolytic solution (ejected matter) discharged from the opened discharge valve have an abnormal high temperature. Particularly, in a battery pack in which battery cell 1 is a non-aqueous electrolyte secondary battery such as a lithium-ion battery, a discharge gas has an abnormal high temperature of 400° C. or higher. Since the lithium-ion battery is filled with a non-aqueous electrolytic solution, when the electrolytic solution is discharged to the outside of the case at a high temperature, the electrolytic solution may be ignited by being in contact with air, and may have an abnormal higher temperature. In not only the lithium-ion battery but also other chargeable batteries, since the discharge gas ejected from the opened discharge valve has a high temperature, it is important to attenuate the energy of the discharge gas and exhaust the discharge gas to the outside of the case for enhancing safety.

(Battery Holder 4)

In battery pack 100 of FIGS. 1 to 4, a plurality of battery cells 1 is arranged at the fixed positions in battery holders 4, and is arranged as battery block 10 in case 2. Battery block 10 includes two sets of battery assemblies 11. In battery assembly 11, battery cells 1 are arranged at fixed positions by inserting battery cells 1 into battery holders 4. In battery holder 4, battery cells 1 are arranged in four rows in parallel to side wall 23 of case 2. Battery block 10 in which two sets of battery assemblies 11 are arranged in two stages in a longitudinal direction of case 2 and eight battery cells 1 are connected in series and in parallel in four rows and two stages is provided. In each battery assembly 11, the openings of the discharge valves of two battery cells 1 are arranged in case 2 so as to face end wall 24. In battery pack 100 in the drawing, battery assembly 11 includes four battery cells 1, battery block 10 includes two sets of battery assemblies 11, and battery block 10 is disposed in case 2. However, the battery pack of the present invention does not specify a number or connection state of the battery cells housed in the case.

(Circuit Board 3)

An electronic component (not illustrated) connected to battery cells 1 to achieve a protection circuit for battery cells 1 is mounted on circuit board 3. The protection circuit is a circuit that prevents overcharge and overdischarge of battery cells 1, a circuit that prevents overcurrent, or a circuit that interrupts current in a state in which the temperature rises abnormally.

(Flame-Retardant Cap 6)

Flame-retardant cap 6 is disposed on an inner surface of case 2 with diffusion gap 28 provided between the flame-retardant cap and discharge valve side end surface 1a of battery cell 1. Flame-retardant cap 6 includes collision plate 6A disposed at a position facing discharge valve side end surface 1a and peripheral walls 6B formed around collision plate 6A. The discharge valve of battery cell 1 and a region in proximity are arranged inside peripheral walls 6B, reverse ejection gap 30 is provided between battery cell 1 and peripheral wall 6B, and reverse ejection gap 30 is communicatively connected with diffusion gap 28. In flame-retardant cap 6, collision plate 6A is disposed with diffusion gap 28 provided between the flame-retardant cap and discharge valve side end surface 1a of battery cell 1 such that the discharge gas ejected from the discharge valve can collide and be diffused around. In battery pack 100 of FIGS. 1 and 2, the end surfaces of four battery cells 1 are arranged on an identical plane and are arranged on block end surface 10a of battery block 10. However, in two battery cells 1, discharge valve side end surface 1a (positive electrode in the drawing) is disposed on block end surface 10a, and in two battery cells 1, electrode end surface 1b (negative electrode) on which the discharge valve is not provided is disposed on block end surface 10a. In flame-retardant cap 6, reverse ejection gap 30 is provided between the reverse ejection gap and battery cell 1 by disposing collision plate 6A on the inner surface of case 2 at a position facing entire block end surface 10a of battery block 10 and inserting an end of battery block 10 into peripheral wall 6B provided along an outer periphery of collision plate 6A.

As for flame-retardant cap 6, since discharge valve side end surface 1a and electrode end surface 1b on which the discharge valve is not provided are inserted into flame-retardant cap 6, collision plate 6A is disposed on entire block end surface 10a of battery block 10, and thus, reverse ejection gap 30 is provided between the end of battery block 10 and peripheral wall 6B. The discharge gas discharged from the discharge valve collides with collision plate 6A, is diffused into diffusion gap 28, flows into reverse ejection gap 30 from diffusion gap 28, is redirected in a direction opposite to an ejection direction of the discharge valve, and flows into expansion space 25.

When diffusion gap 28 and reverse ejection gap 30 are too narrow, since the discharge gas cannot smoothly pass therethrough, the diffusion gap and the reverse ejection gap are preferably greater than 0.5 mm and preferably greater than or equal to 1 mm. When diffusion gap 28 and reverse ejection gap 30 are widened, since an outer shape of case 2 becomes large, diffusion gap 28 and reverse ejection gap 30 are preferably narrowed to less than 5 mm. In particular, since the battery pack of the present invention is suitable for, for example, a small-sized battery pack for home electric appliances having relatively small-capacity battery cell 1 in which the charge capacity of battery cell 1 is less than or equal to 5 Ah built therein, it is important to reduce a size and a weight by simplifying the entire structure.

Flame-retardant cap 6 is a flexible heat-resistant sheet that is not melted by the discharge gas ejected from the discharge valve and can be bent. An inorganic sheet in which inorganic fibers are assembled into a sheet shape or a flexible heat-resistant sheet in which inorganic fibers are impregnated with plastic is suitable for flame-retardant cap 6. The end of battery cell 1 can be easily disposed as flame-retardant cap 6 inside peripheral wall 6B by cutting the flexible heat-resistant sheet that can be bent as illustrated in a development view of FIG. 4 and bending the heat-resistant sheet at a right angle at a boundary between collision plate 6A and peripheral wall 6B indicated by a chain line. However, flame-retardant cap 6 is not necessarily required to be a flexible heat-resistant sheet that can be bent. For example, the flame-retardant cap can be produced by using a mica plate or an inorganic material as an inorganic plate having a cap shape, and molding plastic having excellent heat resistance, for example, a thermoplastic resin such as a nylon resin or a fluorocarbon resin into a cap shape or molding plastic having more excellent heat resistance such as a silicon resin or a polyimide resin into a cap shape.

(Case 2)

Entire case 2 is molded into a rectangular cuboid. Case 2 is molded by a thermoplastic resin such as polycarbonate. Case 2 has a plurality of battery cells 1 arranged at the fixed positions in battery holders 4, circuit board 3, and flame-retardant caps 6. Case 2 in the drawing includes upper case 2A and lower case 2B. At lower case 2B and upper case 2A, peripheral wall 22 is provided around surface plate 21 having a quadrangular shape, specifically, a rectangular shape in the drawing. Lower case 2B and upper case 2A are coupled with opening end surfaces of peripheral wall 22 as mating surfaces. Peripheral wall 22 includes side walls 23 on both sides extending in a longitudinal direction of rectangular surface plate 21 and end walls 24 orthogonal to side walls 23. In case 2 of FIGS. 1 to 3, since battery block 10 is disposed such that end wall 24 is disposed at a position facing discharge valve side end surface 1a of battery cell 1, flame-retardant cap 6 is disposed on an inner surface of end wall 24.

(Flue Gas Hole 27)

A plurality of flue gas holes 27 is provided in case 2. In case 2 of FIGS. 1 to 3, the plurality of flue gas holes 27 is provided in side walls 23 of case 2. Since flue gas holes 27 can increase the permeation resistance of the discharge gas by reducing the size and can reduce the total permeation resistance by reducing the number, an inner diameter and the number of flue gas holes are set such that the discharge gas can be smoothly dispersed by attenuating the discharge gas to be low energy and can be exhausted. The inner diameter and the number of flue gas holes 27 are optimally designed according to the capacity of battery cell 1, that is, the amount of discharge gas discharged from the opened discharge valve. For example, in a lithium-ion battery having a cylindrical shape commonly called "18650", the inner diameter is preferably 0.5 mm to 3 mm, and the number of flue gas holes is preferably 10 to 100. However, the present invention does not specify the inner diameter and the number of flue gas holes 27, and the inner diameter and the number of flue gas holes are set to optimum values in consideration of the type and capacity of battery cell 1, required safety, and the like. As indicated by a chain line in FIG. 1, labels 7 peeled off by the discharge gas are attached to flue gas holes 27. As described above, flue gas holes 27 are blocked by labels 7, foreign substances are prevented from entering in a state in which the discharge valve is not opened.

(Expansion Space 25)

Case 2 includes expansion space 25 of the discharge gas that collides with collision plate 6A of flame-retardant cap 6, is diffused in diffusion gap 28, and flows out from reverse ejection gap 30. The discharge gas ejected from the discharge valve collides with collision plate 6A of flame-retardant cap 6, and fills expansion space 25 via diffusion gap 28 and reverse ejection gap 30. Expansion space 25 is communicatively connected with reverse ejection gap 30 and flue gas holes 27, expands and disperses the discharge gas flowing in from reverse ejection gap 30, and further redirects the discharge gas to disperse and flow into the plurality of flue gas holes 27. Expansion space 25 is formed by a gap between the inner surface of case 2 and a built-in object. Since battery assemblies 11 in which battery cells 1 are fixed at the fixed positions by battery holders 4 and circuit board 3 fixed to battery holders 4 are built in case 2, the expansion space is configured with a gap formed between the built-in object and the inner surface of case 2 and all gaps formed in a communicative manner between battery cells 1, battery holders 4, and circuit board 3 as built-in objects. Expansion space 25 can expand the discharge gas flowing in from reverse ejection gap 30 to a larger volume by increasing a volume. Accordingly, expansion space 25 is set to have a sufficiently large volume as compared with diffusion gap 28 and reverse ejection gap 30, preferably greater than or equal to 10 times, more preferably greater than or equal to 50 times of diffusion gap 28 and reverse ejection gap 30.

Second Exemplary Embodiment

Figure 5:
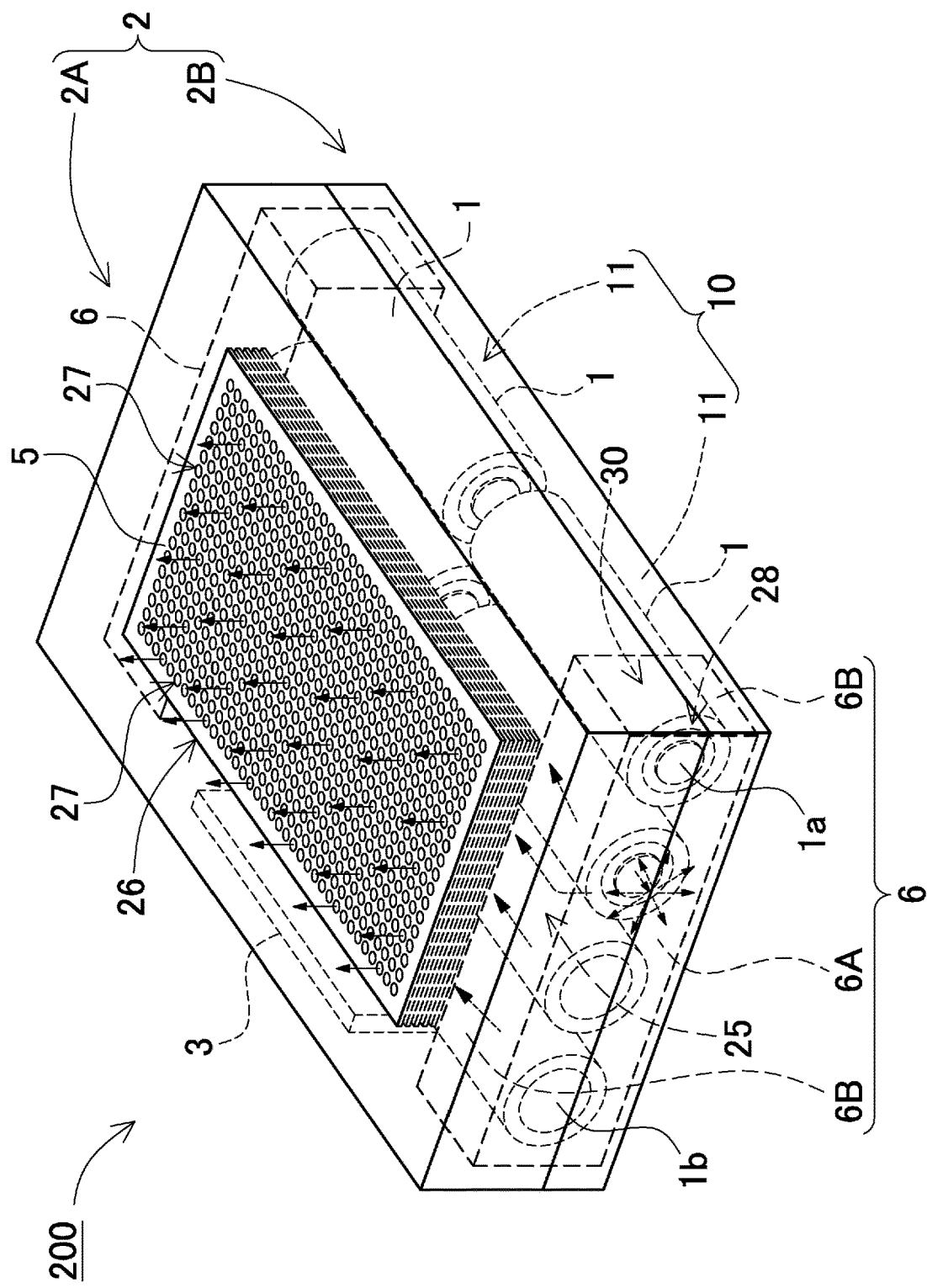
FIG. 5 is a schematic perspective view illustrating an internal structure of a battery pack according to a second exemplary embodiment of the present invention.
Figure 6:
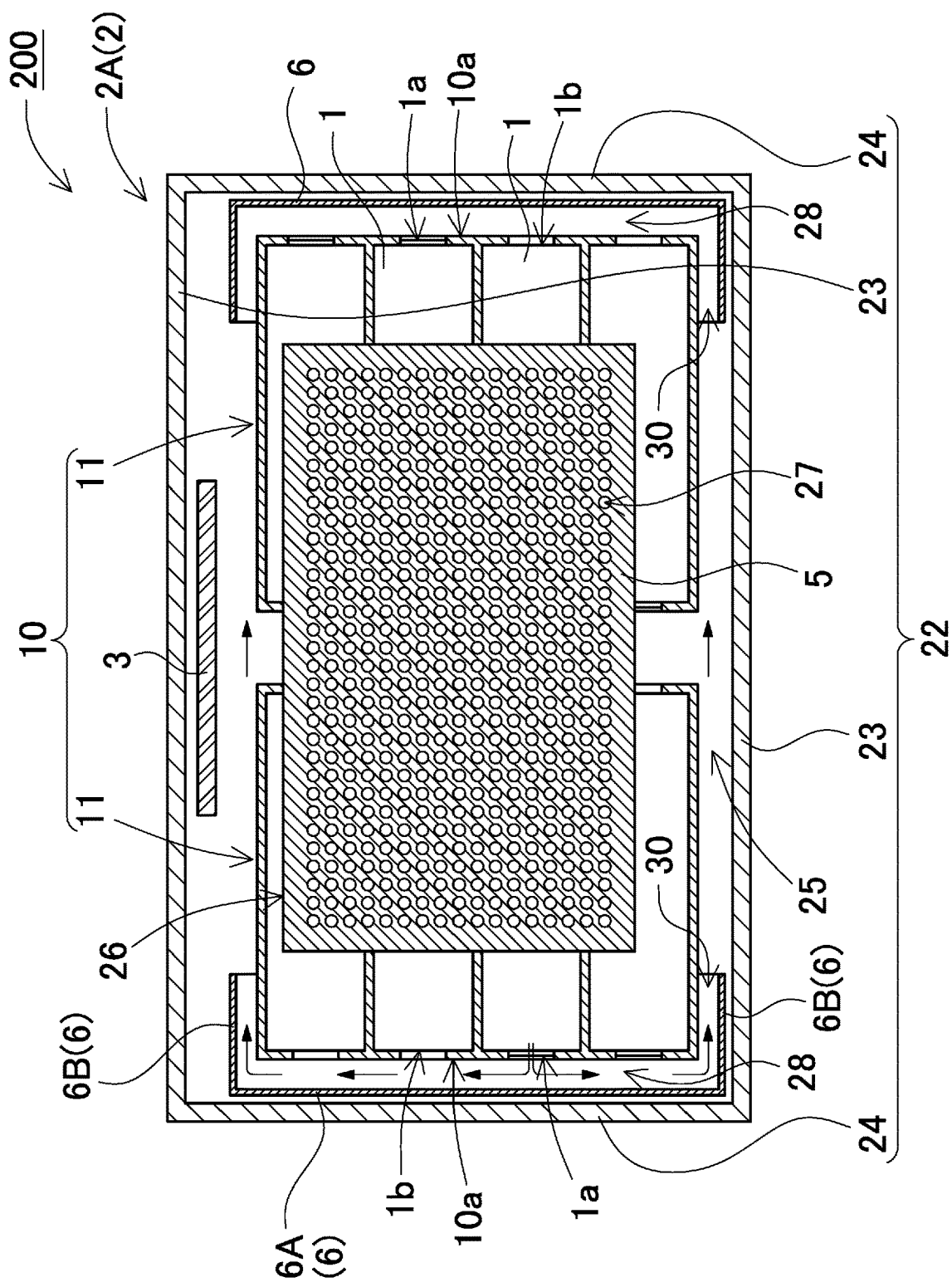
FIG. 6 is a schematic horizontal cross-sectional view illustrating the internal structure of the battery pack according to the second exemplary embodiment of the present invention.
Figure 7:
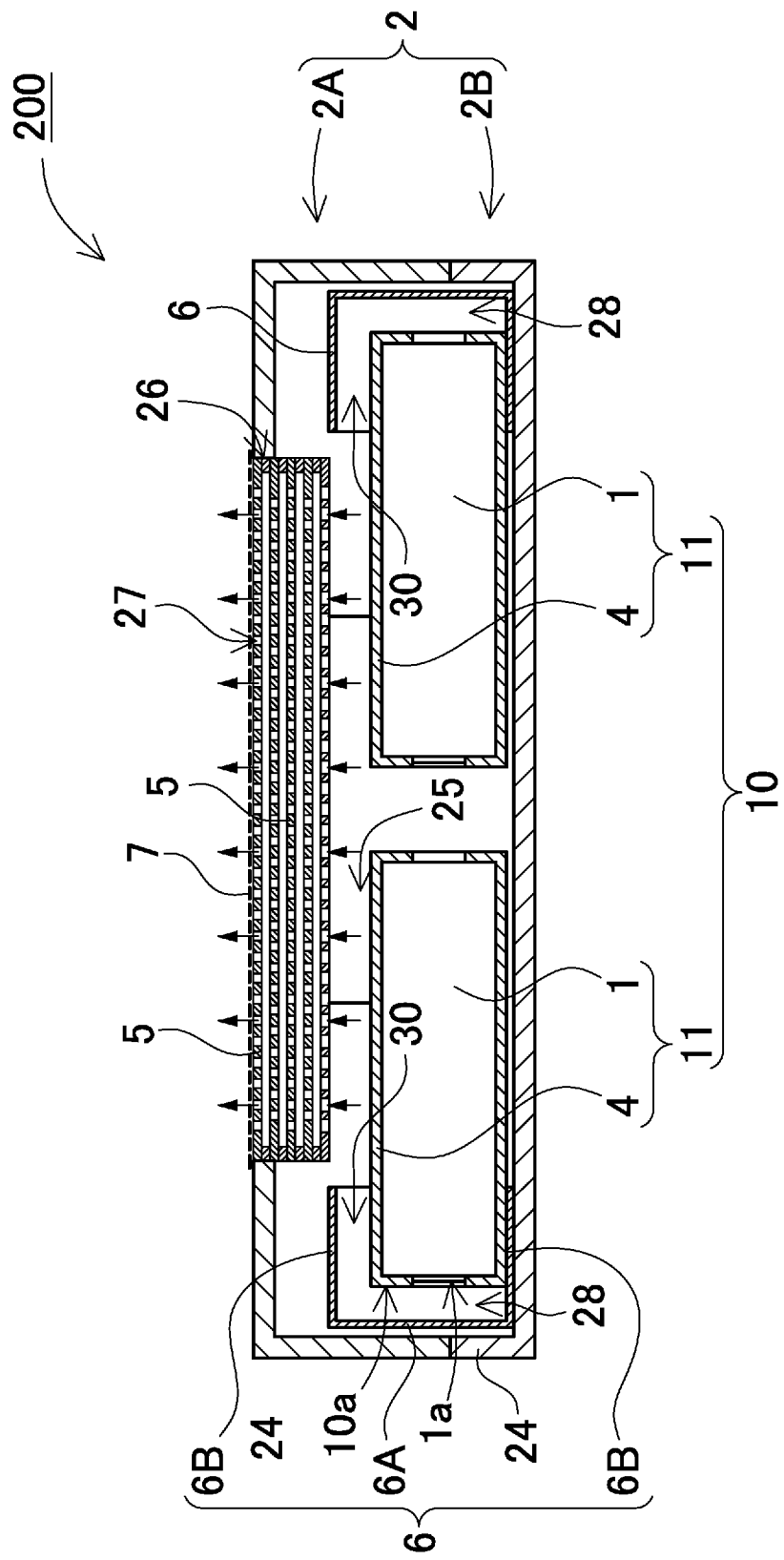
FIG. 7 is a vertical longitudinal sectional view of the battery pack according to the second exemplary embodiment of the present invention.

Battery pack 200 of FIGS. 5 to 7 has the same structure as the structure of the first exemplary embodiment except that opening 26 is provided in surface plate 21 of case 2 and opening 26 is blocked by porous plate 5 in which flue gas holes 27 are provided. At least a part of case 2 in FIGS. 5 to 7 is porous plate 5 having many through-holes. In case 2 illustrated in the drawing, opening 26 is formed on substantially the entire surface of surface plate 21 of upper case 2A, and opening 26 is blocked by porous plate 5. In battery pack 200, since the discharge gas is smoothly exhausted by increasing opening 26 of case 2, an opening area of opening 26 is preferably greater than or equal to 40%, more preferably greater than or equal to 50% of surface plate 21. In case 2 in this drawing, the opening area of opening 26 is increased by providing opening 26 having a rectangular shape in rectangular surface plate 21.

Opening 26 is blocked by porous plate 5 in which flue gas holes 27 through which the discharge gas can pass are provided. Porous plate 5 is bonded and fixed to surface plate 21 by a structure such as adhesion or welding, or is fixed by a fitting structure. Porous plate 5 is fixed so as not to form a gap between the porous plate and opening 26. The plurality of porous plates 5 is stacked so as to attenuate and exhaust the energy of the discharge gas. Expansion gap 8 of the discharge gas is provided between stacked porous plates 5. Each of stacked porous plates 5 has a structure in which flue gas holes 27 are arranged at non-facing positions not facing each other and the discharge gas does not flow linearly through the plurality of porous plates 5 to be exhausted. Porous plate 5 is obtained by molding plastic into a plate shape, and a plurality of flue gas holes 27 is provided in the porous plate.

Porous plate 5 can safely exhaust a high-energy discharge gas by using plastic having heat resistance capable of attenuating the energy of the discharge gas and exhausting the discharge gas to the outside. Although it is ideal that porous plate 5 is molded by plastic having heat resistance that is not thermally deformed by the temperature of the discharge gas, the structure in which the plurality of porous plates 5 is stacked with expansion gap 8 may not have heat resistance that all porous plates 5 are not thermally deformed by the discharge gas. This is because even though porous plate 5 on the inner side is thermally deformed, the safety of battery pack 200 can be ensured by maintaining the discharge gas in a state in which porous plate 5 on the outer side can attenuate and exhaust the discharge gas by the plurality of remaining flue gas holes 27. There are characteristics that porous plate 5 obtained by stacking a plurality of sheets can be produced in large quantities at low cost by injection molding with a thermoplastic resin such as polycarbonate. However, the present invention does not specify the plastic of porous plate 5, and the porous plate can be molded with a thermoplastic resin having more excellent heat resistance, for example, a thermoplastic resin such as a nylon resin or a fluorocarbon resin, and can also be molded with plastic having more excellent heat resistance such as a silicone resin or a polyimide resin.

Figure 8:
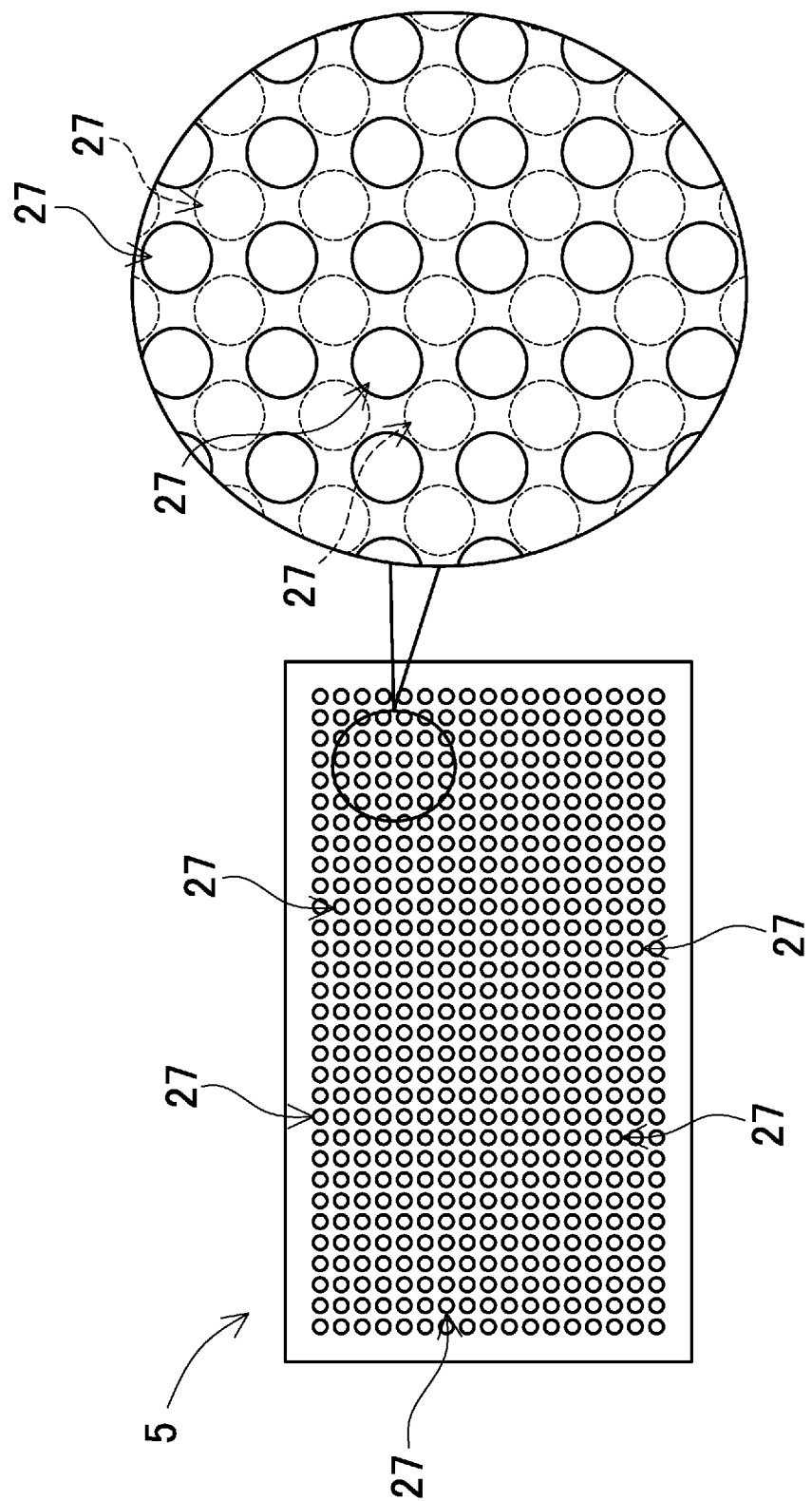
FIG. 8 is a partially enlarged plan view illustrating a stacked state of porous plates.

In porous plate 5 illustrated in plan view of FIG. 8, flue gas holes 27 each having a circular shape are arranged at intersections of the checkerboard lattice such that vertical and horizontal pitches of flue gas holes 27 are constant. Flue gas holes 27 can increase the permeation resistance of the discharge gas by reducing the size, but when the flue gas hole is too small, since the discharge gas cannot be smoothly exhausted to the outside of case 2, the inner diameter is preferably 1 mm to 3 mm. The discharge gas vigorously ejected from the discharge valve first permeates through porous plate 5 stacked on the innermost side of case 2. In this porous plate 5, flue gas hole 27 is set to be larger than other porous plates 5, and thus, the discharge gas ejected from the discharge valve can smoothly permeate through flue gas hole 27. However, flue gas holes 27 of all porous plates 5 may have the same size. The discharge gas having permeated through flue gas holes 27 is ejected into expansion gap 8, and is adiabatically expanded. The temperature of the discharge gas adiabatically expanded in expansion gap 8 decreases. In the structure in which three or more porous plates 5 are stacked, since expansion gap 8 is formed in a plurality of layers, whenever the discharge gas permeates through flue gas holes 27 and flows into expansion gap 8, the discharge gas is adiabatically expanded to decrease the temperature.

Since porous plate 5 can lengthen flue gas hole 27 to increase the permeation resistance of the discharge gas by increasing a thickness, the thickness of porous plate 5 is preferably 1 mm to 3 mm. However, in the present invention, the inner diameter of flue gas hole 27 and the thickness of porous plate 5 are not specified to the above ranges, and the porous plate can have a shape in which the energy of the discharge gas is attenuated to exhaust the discharge gas by providing a plurality of smaller flue gas holes or a small number of larger flue gas holes and increasing or decreasing the porous plate. The pitch of flue gas holes 27 is set to a dimension in which flue gas holes 27 of facing porous plates 5 are arranged at non-facing positions and a part of flue gas holes 27 is not arranged at a facing position of stacked porous plates 5. As illustrated in the plan view of FIG. 8, porous plates 5 in which flue gas holes 27 are arranged in a checkerboard lattice shape are arranged at positions at which four flue gas holes 27 provided in porous plate 5 to be stacked do not overlap each other around flue gas holes 27 provided in one porous plate 5. However, a structure in which the energy of the discharge gas can be attenuated and the discharge gas can be safely exhausted to the outside can also be adopted even with a structure in which a part of flue gas holes 27 provided in porous plates 5 arranged to face each other is arranged at positions overlapping with each other. This is because most of the discharge gas having permeated through flue gas holes 27 collides with the surface of stacked porous plates 5 and the energy is attenuated.

Figure 9:
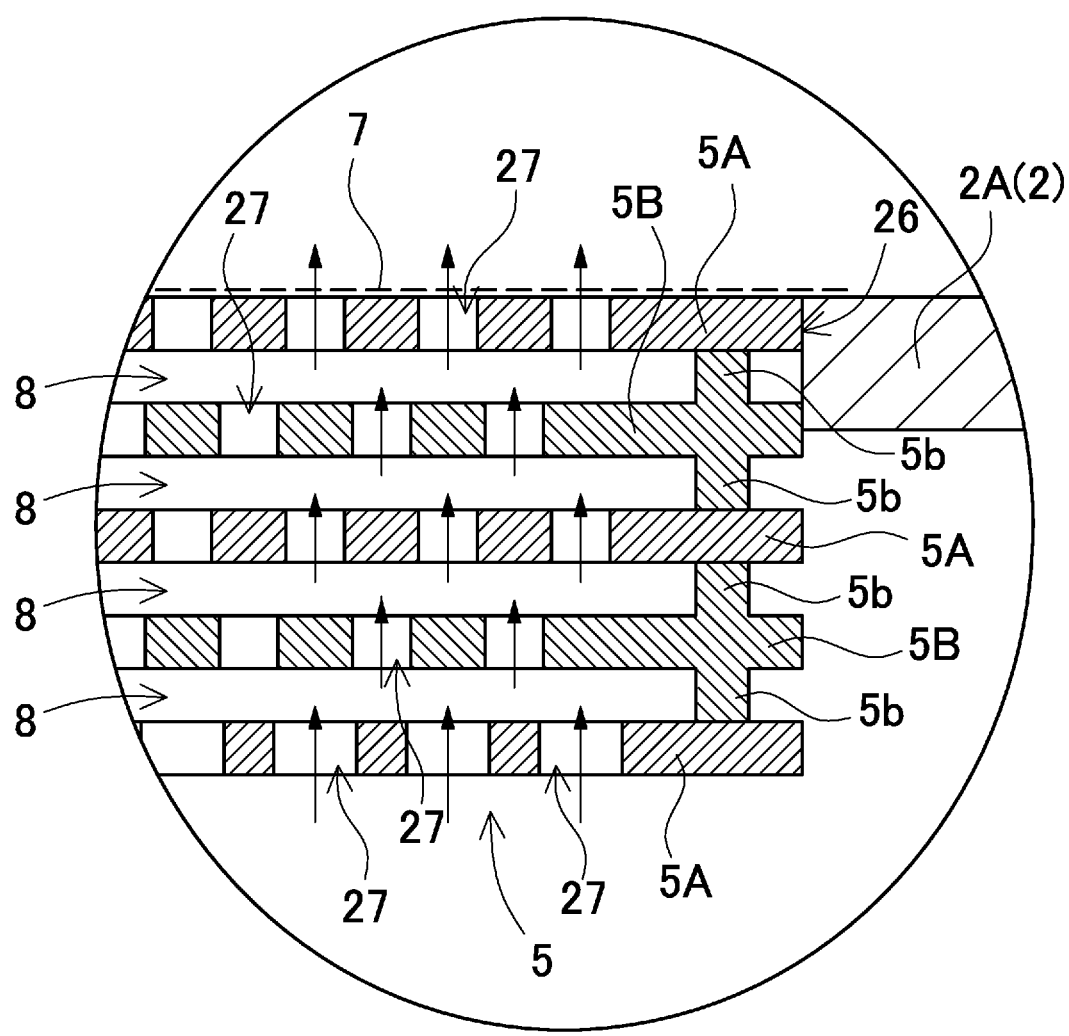
FIG. 9 is an enlarged cross-sectional view illustrating the stacked state of the porous plates.
Figure 10:
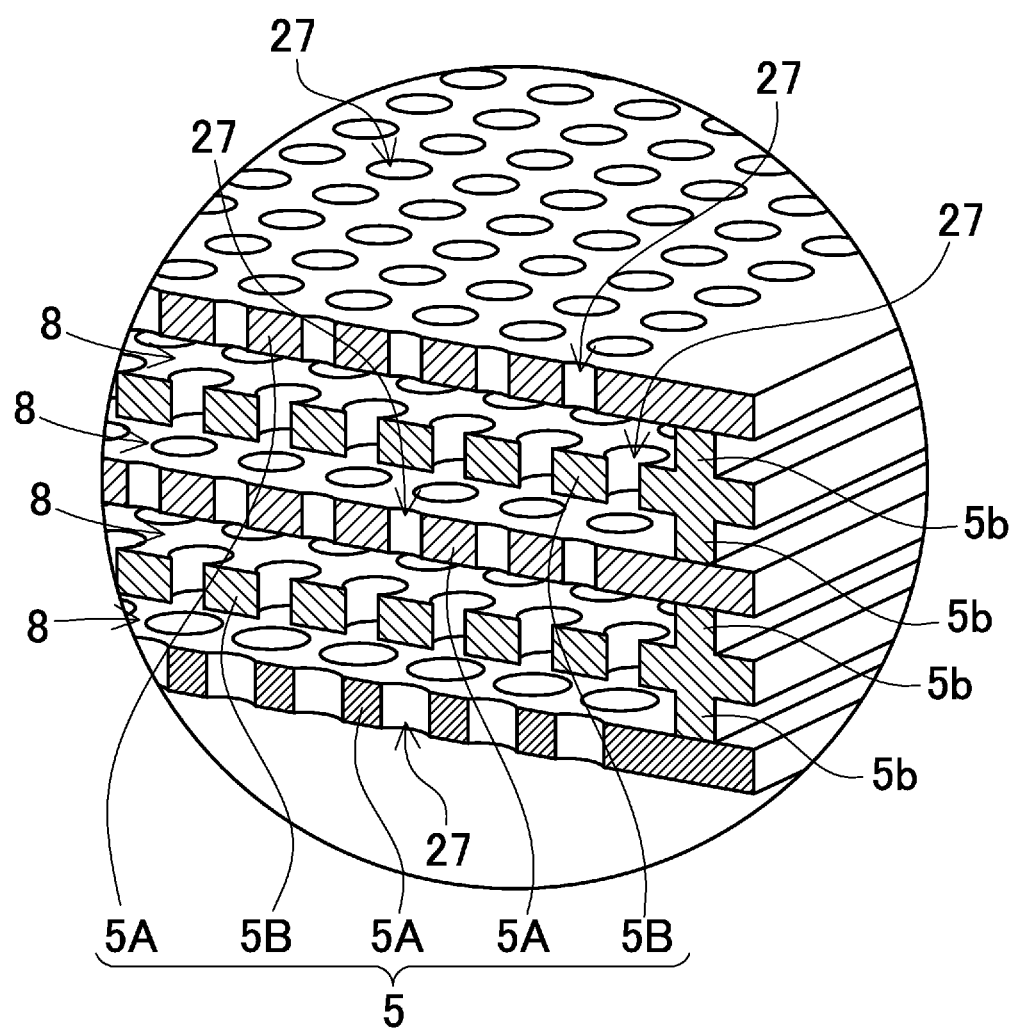
FIG. 10 is an enlarged cross-sectional perspective view illustrating the stacked state of the porous plates.

As illustrated in FIGS. 9 and 10, porous plates 5 are stacked and provided such that protrusions 5b are integrally molded on the surface and expansion gap 8 having a certain gap is formed. Protrusions 5b illustrated in the drawing are spacer ribs integrally molded along side edges of porous plate 5. A protrusion height of protrusion 5b which is the spacer rib specifies a dimension of expansion gap 8. In porous plate 5 illustrated in a cross-sectional view of FIG. 9, expansion gap 8 is substantially equal to the thickness of porous plate 5, but expansion gap 8 may be narrower or wider than the thickness of porous plate 5. Narrow expansion gap 8 can more effectively attenuate the energy of the discharge gas by increasing the permeation resistance of the discharge gas, but cannot smoothly exhaust the discharge gas. When expansion gap 8 is widened, the plurality of porous plates 5 is stacked and thickened. Accordingly, expansion gap 8 is set to have a dimension, for example, 2 mm to 5 mm which allows the discharge gas to be smoothly exhausted while entire stacked porous plates 5 is set to be as thin as possible and can further safely discharge the discharge gas by preventing adverse effects such as ignition.

Protrusions 5b are scattered and arranged on an outer periphery of porous plate 5 and are also arranged in a central portion if necessary, and can be stacked while constant expansion gap 8 is maintained. FIGS. 9 and 10 illustrate porous plates 5 stacked in five layers. In porous plates 5 illustrated in these drawings, two types of porous plates 5 including planar porous plate 5A and intermediate porous plate 5B are alternately stacked. In planar porous plate 5A and intermediate porous plate 5B, flue gas holes 27 are provided at positions not facing each other, that is, at non-facing positions. Intermediate porous plate 5A is provided by integrally molding protrusions 5b protruding from both surfaces. Porous plates 5 having this shape can be stacked by alternately stacking two types of porous plates 5, arranging flue gas holes 27 at the non-facing positions, and providing constant expansion gap 8 between porous plates 5. Porous plates 5 illustrated in FIGS. 9 and 10 have a 5-layer stacked structure by stacking three planar porous plates 5A and two intermediate porous plates 5B. Planar porous plates 5A are stacked on both surfaces and in the middle, and intermediate porous plates 5B are stacked between planar porous plates 5A. This structure can be a stacked structure in which the number of stacked sheets is an odd number by alternately stacking porous plates 5 made of plastic and molded in two types of shapes. In porous plates 5 illustrated in FIGS. 9 and 10, flue gas holes 27 provided in planar porous plate 5A disposed on an innermost side are set to be larger than flue gas holes 27a of other porous plates 5. As described above, in battery pack 100 in which flue gas holes 27 of porous plates 5 stacked on the innermost side of case 2 are enlarged, since only porous plates 5 stacked on the innermost side are molded separately, three or more odd-numbered layers can be stacked by stacking porous plates 5 molded in three types of shapes.

In battery pack 200, expansion space 25 is provided inside case 2. In battery pack 200, the discharge gas ejected from the discharge valve is ejected into flame-retardant cap 6, and the energy is attenuated in diffusion gap 28 and reverse ejection gap 30. Thereafter, the discharge gas is ejected into expansion space 25, and the energy is further attenuated in expansion space 25. Thereafter, the energy is attenuated by flue gas holes 27 provided in stacked porous plates 5 and expansion gap 8 provided between porous plates 5, and the discharge gas is discharged to the outside of the case. Flue gas holes 27 attenuate the energy of the discharge gas by the permeation resistance through which the discharge gas permeates, and expansion gap 8 causes the discharge gas having permeated through flue gas holes 27 to collide with the surface of porous plates 5 and attenuates the energy of the discharge gas.

Battery pack 200 illustrated in a schematic perspective view of FIG. 5 is disposed in a direction in which an ejection direction of the discharge gas ejected from battery cells 1 and a direction in which the discharge gas permeates through flue gas holes 27 of porous plates 5 intersect each other. Battery cells 1 extend in the longitudinal direction of rectangular surface plate 21, and porous plates 5 are arranged in parallel to surface plate 21 so as to block flue gas holes 27 provided in surface plate 21. Battery cells 1 eject the discharge gas from the opened discharge valves in a direction parallel to the surface of surface plate 21, and flue gas holes 27 cause the discharge gas to permeate in a direction orthogonal to surface plate 21 and exhausts the discharge gas. That is, the ejection direction of the discharge gas and the exhaust direction of flue gas holes 27 intersect each other, and are directions orthogonal to each other in the drawing. Thus, the discharge gas is redirected in case 2, and is exhausted to the outside.

The discharge gas ejected into case 2 from the discharge valves flows in directions indicated by arrows in FIGS. 5 to 7 and is exhausted to the outside of case 2. In battery cell 1, the opening of the discharge valve is disposed to face end wall 24 of case 2. The discharge gas ejected from the discharge valves is ejected toward end walls 24. Since flame-retardant cap 6 is disposed inside end wall 24, the discharge gas collides with collision plate 6A of flame-retardant cap 6 and is scattered around by in diffusion gap 28, is redirected, and flows into reverse ejection gap 30. The discharge gas that collides with flame-retardant cap 6 and is redirected from diffusion gap 28 to reverse ejection gap 30 flows into expansion space 25 and is further diffused. The energy is attenuated. As indicated by the arrows in the drawing, the discharge gas flowing into expansion space 25 collides with an inner surface of case 2, is dispersed, is redirected, and is exhausted to the outside from flue gas holes 27. As indicated by the arrows in the drawing, the discharge gas collides with the inner surface of case 2, is dispersed, and is redirected. The energy of the discharge gas is attenuated, and the discharge gas permeates through flue gas holes 27. The energy of the discharge gas is further attenuated by flue gas holes 27 and expansion gap 8, and the discharge gas is exhausted to the outside of case 2. The structure in which the energy of the discharge gas is attenuated and the discharge gas is exhausted to the outside of case 2 can improve safety by suppressing adverse effects such as ignition outside case 2.

INDUSTRIAL APPLICABILITY

The present invention can be effectively used for a battery pack that safely exhausts a discharge gas.

REFERENCE MARKS IN THE DRAWINGS 100, 200: battery pack
1: battery cell
1a: discharge valve side end surface
1b: electrode end surface
2: case
2A: upper case
2B: lower case
3: circuit board
4: battery holder
5: porous plate
5A: planar porous plate
5B: intermediate porous plate
5b: protrusion
6: flame-retardant cap
6A: collision plate
6B: peripheral wall
7: label
8: expansion gap
10: battery block
10a: block end surface
11: battery assembly
21: surface plate
22: peripheral wall
23: side wall
24: end wall
25: expansion space
26: opening
27: flue gas hole
28: diffusion gap
30: reverse ejection gap

The invention claimed is:

1. A battery pack comprising:
a battery cell including:
   a pair of end surfaces opposite each other,
   a side surface extending between the pair of end surfaces, and
   a discharge valve at a discharge valve side end surface being one of the pair of end surfaces of the battery, the discharge valve opened when an internal pressure of the battery cell exceeds a set pressure; and
a case housing the battery cell, wherein
the battery pack further comprises a flame-retardant cap disposed at a position facing the discharge valve side end surface of the battery cell with a diffusion gap provided between the discharge valve side end surface and the flame-retardant cap,
the flame-retardant cap includes:
   a collision plate disposed at a position facing the discharge valve side end surface, and
   a peripheral wall extending from a perimeter of the collision plate in a direction different from a plane of the collision plate, so as to define a three-dimensional space by the peripheral wall and the collision plate,
an entirety of the discharge valve side end surface and a portion of the side surface adjacent thereto of the battery cell are arranged inside the three-dimensional space, and a reverse ejection gap is provided between said portion of the side surface of the battery cell and the peripheral wall,
an expansion space of a discharge gas flowing in from the reverse ejection gap is provided inside the case, and
in the expansion space, the discharge gas ejected from the discharge valve collides with the collision plate of the flame-retardant cap, and fills the expansion space via the diffusion gap and the reverse ejection gap.

2. The battery pack according to claim 1, wherein
the case includes a plurality of flue gas holes that discharges the discharge gas ejected from the discharge valve of the battery cell to an outside of the case,
each of the plurality of flue gas holes is opened to a surface of the case in a direction in which a discharge direction of the discharge gas discharged from the plurality of flue gas holes and an ejection direction of the discharge gas discharged from the discharge valve of the battery valve intersects each other,
the expansion space is communicatively connected with the reverse ejection gap and inner openings of the plurality of flue gas holes of an inner surface of the case, and
the discharge gas ejected from the discharge valve is dispersed into the plurality of flue gas holes in the expansion space and is discharged to the outside of the case.

3. The battery pack according to claim 1, wherein the flame-retardant cap is a heat-resistant sheet.

4. The battery pack according to claim 3, wherein the flame-retardant cap is a heat-resistant fiber sheet made of heat-resistant fibers into a sheet shape.

5. The battery pack according to claim 4, wherein the flame-retardant cap is a nonwoven fabric assembled from heat-resistant fibers without directionality, or a fiber sheet braided from heat-resistant fibers.

6. The battery pack according to claim 4, wherein the heat-resistant fibers are either inorganic fibers or heat-resistant plastic fibers.

7. The battery pack according to claim 1, wherein the flame-retardant cap is either a heat-resistant plastic sheet or a heat-resistant plastic plate.

8. The battery pack according to claim 1, wherein the battery cell is a non-aqueous electrolyte secondary battery.

9. The battery pack according to claim 8, wherein the battery cell is a lithium-ion battery.

10. The battery pack according to claim 1, wherein
the battery cell is one of cylindrical batteries, and a battery block is provided by arranging end surfaces of the cylindrical batteries in an identical plane and arranging the batteries in parallel with each other, and
an end of the battery block is inserted into the flame-retardant cap.

11. The battery pack according to claim 1, wherein the case has a non-sealed structure.

12. The battery pack according to claim 11, wherein at least a part of the case is a porous plate including a plurality of through-holes.

* * * * *